Figure 3:
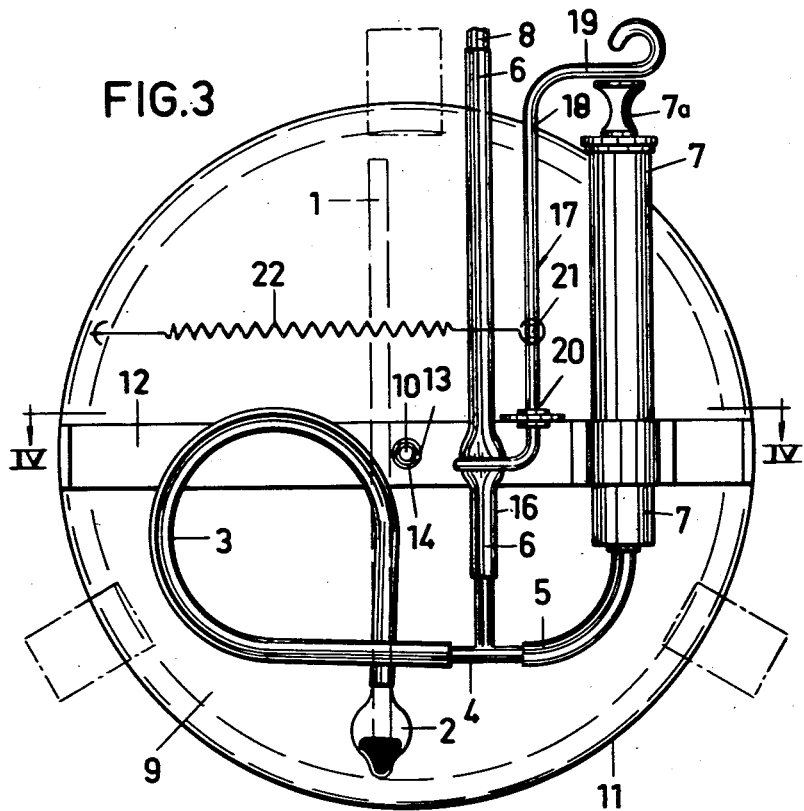

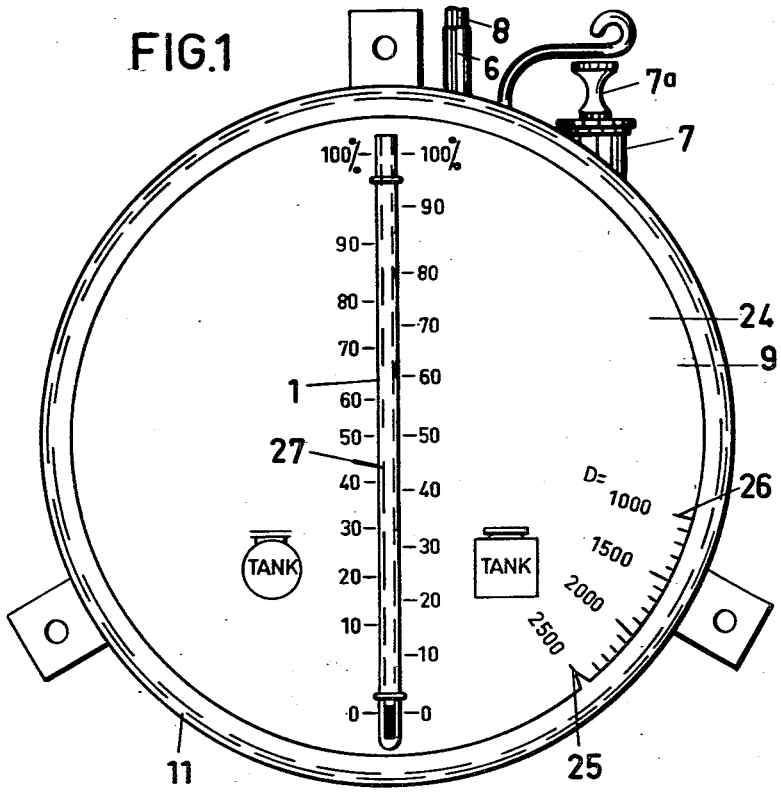

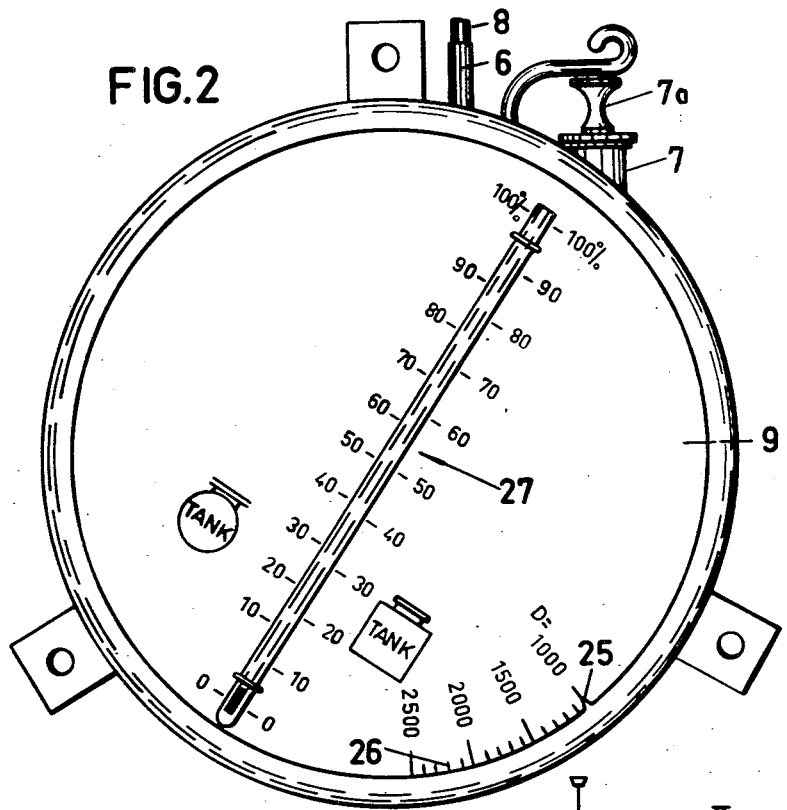
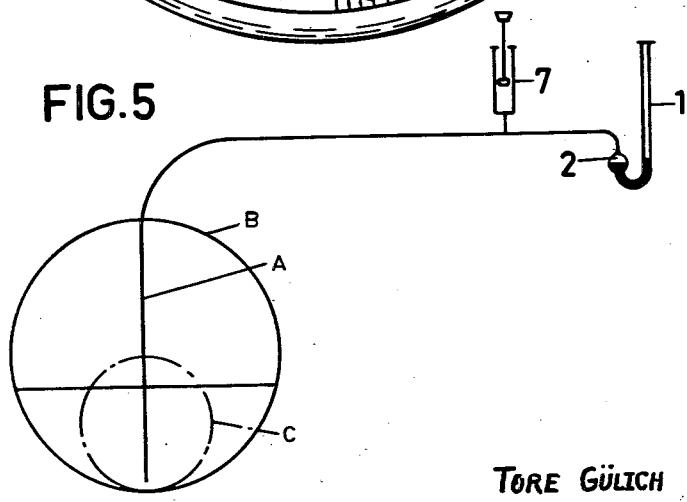

June 25, 1957 T. GÜLICH 2,796,764
LIQUID-GAUGE
Filed Nov. 3, 1953 3 Sheets-Sheet 3

TORE GÜLICH
INVENTOR

By Wenderoth, Lind and Ponack
ATTORNEYS

United States Patent Office 2,796,764
Patented June 25, 1957

2,796,764
LIQUID-GAUGE

Tore Gülich, Malmö, Sweden

Application November 3, 1953, Serial No. 390,001

Claims priority, application Sweden November 6, 1952

1 Claim. (Cl. 73—302)

The present invention relates to a gauge for liquids, particularly such liquids as are kept in vessels difficult to get at, e. g. in the form of containers dug into the earth in which fuel oils and similar oils are stored. In order to measure the content of such containers there is frequently used a gauge having a tube vertically disposed in the container, said tube almost reaching the bottom of the container with one of its ends and connected at the other end through suitable conduits to a pressure medium source and a pressure indicator, usually in the form of a mercury manometer tube, said manometer tube having a bent end which is widened so as to form a vessel. When the content of the container is measured the pressure source is caused to discharge pressure medium whereby a pressure increase is brought about in the closed space between the liquid column in the tube in the container and the mercury in the pressure indicator. During this pressure increase the liquid column is moved downwards in the container tube and the liquid forming the column is pressed into the container while the mercury in the form of a column is pressed upwards in the pressure indicator. It will be understood that the height of the mercury column is proportional to the liquid quantity forced into the container tube thus making it possible, by means of a suitable scale, directly to read off the contents of the container expressed in liters directly.

Containers for liquid and particularly those for fuel oils are manufactured in a great number of sizes, which has entailed great difficulties for the manufacturers of the gauges mentioned above. These must be provided with the gradation suitable for each case but there still remains the possibility that erroneous indication and negligent mounting may make the gauge misleading.

The present invention relates to a gauge in which the above-mentioned drawbacks are completely eliminated and which gauge can be used, after a simple readjustment, on containers of every size met with in practice. The gauge according to the invention has the mercury manometer tube disposed in such a way that it can be arranged both in an upright and in an inclined position, whereby the force available for pressing the mercury upwards in the tube, in dependence on the position of the tube, can press a smaller or greater mercury column upwards, so that the gauge can be adjusted for use on containers of different sizes in which liquid columns corresponding to the same mercury columns represent quantities of liquid which occupy different percentages of various containers.

Further objects and advantages of the invention will appear from the following detailed description reference being made to the accompanying drawings showing an embodiment chosen by way of example of a device according to the invention.

Figure 4:
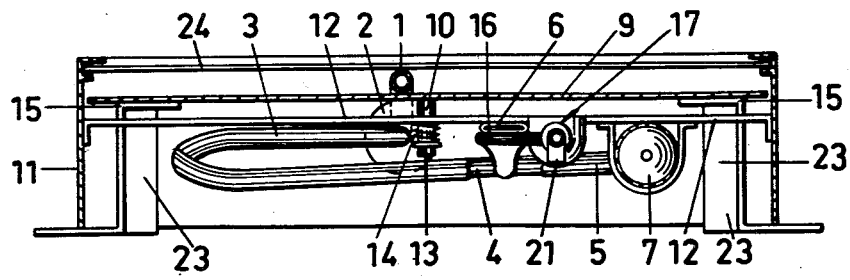

Figs. 1 and 2 are a front view of the gauge adjusted for use on liquid storing vessels of different diameters, Fig. 3 is a rear view of the gauge, partly in section, Fig. 4 is a section on line IV—IV of Fig. 3, and Fig. 5 is a connecting diagram for the gauge.

In the drawings, 1 designates a mercury manometer tube made of glass or any other transparent material, which tube is bent at one of its ends and widened so as to form a vessel 2 for mercury. To the nozzle of the vessel 2, which is formed as a connection piece, there is connected one end of a hose 3 arranged in a coil, the other end of said hose being connected by means of a T-tube 4 and hose pieces 5 and 6 to an air pump 7 actuable manually by handle 7a and to a conduit 8 which is connected to the vertical tube A in a container B, said tube being indicated in Fig. 5. The tube 1 is attached on one side, visible from the front side of the gauge, of a rotatable disk 9, which is pivoted by means of a pivot 10 secured to the disk 9 in a crosspiece 12 extending diametrically in a round casing 11, so that the tube 1 is visible from the front side of the gauge while that end of the tube 1 which is formed into a vessel 2 is disposed on that side of the disk 9 which faces the interior of the gauge. Between the pin 13 on the free end of the pivot 10 and the crosspiece 12 there is disposed a helical spring 14 tending to maintain the disk 9 in contact with abutments 15 on the inside of the casing 11, thereby maintaining the disk in the adjusted position. One arm 16 of an actuating means 17 having the form of a two-armed lever is adapted to abut against the hose piece 6, said actuating means extending through a hole 18 in the casing 11 with an arm 19 disposed outside the casing extending over the handle 7a on the air pump 7 and normally preventing the actuation thereof. The actuating means 17 is rotatably mounted in a bearing 20 disposed in the crosspiece 12 and is actuated by a helical spring 22 disposed between a pin 21 on the actuating means 17 and the wall of the casing 11, whereby the actuating means 17 is normally kept in the position shown in the drawings, throttling the connection between the tube A in the container B on one side and the air pump 7 and the tube 1 on the other, in order to prevent oil from flowing into the gauge in case of pressure above atmospheric in the container B. When the valve formed by the actuating means 17 and its contact with the hose piece 6, thereby pressing said piece flat, is opened through actuation of the means 17, which swings away the arm 16, and when the arm 19 is then moved to such a position that the pump 7 can be actuated, the pressure increase intended for measuring the content in the container B is made possible, which entails displacement of the oil column in the tube A of the container B and the mercury in the tube 1. The abutments 15 are formed by one of the two ends of sheet metal strips 23, the other ends of which extend outside the casing 11 and form attachment means for the gauge. In the casing there is disposed a protective glass 24.

As will appear from the drawings the disk 9 has both a peripheral scale 26 adjustable in relation to an index 25 on the casing 11 by turning the disk and a diametral scale 27 having a dot and dash gradation. The dot gradation is meant to be used on containers having a round cross-section and the dash gradation is meant to be used on containers having a square cross-section.

The gradation of the scale 27 has been computed for a container having a diameter (and height, respectively) of 2500 mm. and a total volume of e. g. 10,000 liters. Thus the scale 27 is a starting scale. It is of course possible to choose other starting values than those indicated. If the container B is filled with liquid and the pressure in the conduits connecting the tubes 1 and A with one another is increased by means of the pump 7, the liquid column in the tube A will be forced into the container and this removed liquid column will correspond to a mercury column pressed upwards in the tube 1 and reaching the figure 10,000 on the scale 27. When the liquid level in the container B has sunk due to liquid having been drawn off and when one wishes to know how much there is left in the container the pump 7 is actuated again. The pressure increase brought about in that connection will force away a liquid column back into the container which perhaps corresponds to a mercury column pressed upwards in the tube 1 only to the numeral 1000 on the scale 27. Each scale line on the scale 27 thus indicates one tenth of the volume of the container B or an increase or reduction in percent computed in the liquid volume which can be pumped into the container. In order to make it possible to use the scale 27 and keep its character of a percental scale for containers having smaller diameters than the one used as a starting diameter the tube 1 is disposed on the rotatable disk 9 whereby the tube 1 can be caused to occupy positions between the vertical position indicated above and a position more or less at an angle in relation to the vertical position. In order to understand this correctly there is indicated in Fig. 5 by means of a dot-and-dash line a container C having a smaller diameter, the liquid level in said container being supposed to be the same as the container B. The forcing of the liquid column in the tube A back into the container caused by the pressure increase described above corresponds to a greater and smaller, respectively, quantity of liquid in the container A and C, respectively, the percental share of which varies with respect to the total volume of the respective container. In order to make it possible for the oil column forced into the container C to cause the mercury column to move upwards to a scale line on the scale 27 corresponding to the percental share of the container occupied by the liquid in relation to the total volume of the largest container the mercury must figuratively speaking be made lighter. When the tube 1 is given a predetermined inclination corresponding to the smaller diameter and when the total volume of the height of the container with the container is marked off in tenths on the scale 27 the gauge gives the correct indication in percent of the total volume of the oil quantity in the container having a smaller diameter, like the container having the diameter chosen as starting diameter.

Fig. 2 shows the gauge adjusted to a container having a diameter of 1000 mm. The total volume of the container is supposed to be 5000 liters. As the liquid column forced back into the container by the pressure increase in a container having this smaller diameter and filled with liquid to the same level as the container having a larger diameter corresponds to a liquid quantity occupying a greater percentage of the total volume of the smaller container than the container having the larger diameter, it can, on account of the inclination of the tube 1, cause the mercury column to be pressed upwards to the percentage corresponding to the correct share occupied in the total volume of the smaller container.

The gauge according to the invention is delivered with the scale 27 but without the necessary numerals, which can be added by the customer. These numerals are determined by the volume of the container on which the gauge is meant to be used. After adjustment of the scale 26 to the number corresponding to the diameter of the container and after mounting the gauge and connecting it to the container the gauge is ready for use and indicates, as already described, after actuation of the pump 7 the liquid quantity in the container with the requisite exactitude. Whether the container volume varies in one and the same diameter is of no importance. The volume is divided into parts in the manner already described, which parts are marked off at the scale lines on the scale 27.

The blocking means for the pump 7 formed by the actuating means 17 and the valve formed by the hose piece 6 at the compression thereof can be modified in many different ways within the scope of the invention.

Of course, the mercury in the tube 1 can be replaced by any other suitable measuring liquid.

Further modifications are possible within the scope of the inventive idea as defined in the appendant claim.

What I claim and desire to secure by Letters Patent is:

A gauge for measuring liquids in containers comprising a tube for vertical disposition in a container such that one end of said tube reaches almost to the bottom of the container, an air pump having actuating means thereon, a mercury manometer tube having one end thereof bent and widened to form a vessel, flexible elastic conduits connecting said mercury manometer tube and said air pump with the upper end of said tube in said container, a rotatable disc on which said mercury manometer tube is mounted, a casing in which said disc is mounted, a rod rotatably mounted in said casing for rotation around its own axis, a spring attached between said rod and said casing, an arm formed at one end of said rod, and another arm formed on the other end of said rod, said spring attached to said rod for rotating it to a position where said one arm extends in front of the actuating means on said pump and the other arm engages and presses flat part of said elastic conduit conected to the upper end of said tube in said container, said mercury manometer tube being of such a length that full container deflection occurs over the entire range of said gauge when the gauge is used in the vertical position for measuring the contents of containers of a given size and when the gauge is used in the inclined position for measuring contents of smaller containers, said mercury manometer tube having two graduated scales thereon, one with the graduations equally spaced for indicating liquid levels in containers with a cross section which is constant throughout the height, and the other with the graduations spaced at varying distances for indicating liquid levels in containers with a cross section which varies throughout its height.

References Cited in the file of this patent

UNITED STATES PATENTS

| | | |
|---|---|---|
| 1,255,063 | Stevens | Jan. 29, 1918 |
| 1,268,292 | Stancliffe | June 4, 1918 |
| 1,457,406 | Stancliffe | June 5, 1923 |
| 2,526,784 | Walker | Oct. 24, 1950 |
| 2,685,797 | Morschel | Aug. 10, 1954 |

FOREIGN PATENTS

| | | |
|---|---|---|
| 312,653 | Germany | May 31, 1919 |